United States Patent
Ragan (10) Patent No.: US 9,122,762 B2
(45) Date of Patent: Sep. 1, 2015

(54) METHOD AND SYSTEM TO MAINTAIN A WEB PAGE

(75) Inventor: Richard Ragan, Mountain View, CA (US)

(73) Assignee: eBay, Inc., San Jose, CA (US)

( * ) Notice: Subject to any disclaimer, the term of this patent is extended or adjusted under 35 U.S.C. 154(b) by 2362 days.

(21) Appl. No.: 11/959,993

(22) Filed: Dec. 19, 2007

(65) Prior Publication Data

US 2009/0024936 A1 Jan. 22, 2009

Related U.S. Application Data

(60) Provisional application No. 60/950,482, filed on Jul. 18, 2007.

(51) Int. Cl.
*G06F 17/30* (2006.01)

(52) U.S. Cl.
CPC .................. *G06F 17/3089* (2013.01)

(58) Field of Classification Search
CPC .................................. G06F 17/3089
USPC ........................... 715/760; 717/125
See application file for complete search history.

(56) References Cited

U.S. PATENT DOCUMENTS

| | | | |
|---|---|---|---|
| 5,956,709 A | | 9/1999 | Xue et al. |
| 6,021,416 A | * | 2/2000 | Dauerer et al. ............... 715/207 |
| 6,944,828 B2 | | 9/2005 | Gao et al. |
| 7,096,417 B1 | | 8/2006 | Bennett et al. |
| 7,178,102 B1 | | 2/2007 | Jones et al. |
| 7,231,644 B2 | | 6/2007 | Kieffer |
| 7,392,510 B1 | * | 6/2008 | Treder et al. ................... 717/128 |
| 7,519,956 B2 | * | 4/2009 | Fukuda et al. ................. 717/125 |
| 7,644,315 B2 | * | 1/2010 | Tsun ........................... 714/38.14 |
| 7,685,229 B1 | * | 3/2010 | George et al. ................. 709/203 |
| 2002/0004803 A1 | | 1/2002 | Serebrennikov |
| 2002/0111992 A1 | * | 8/2002 | Copeland et al. ............. 709/203 |

OTHER PUBLICATIONS

"Aardvark Firefox Extension." Feb. 3, 2006. Retrieved from the Internet: <URL: http://web.archive.org/web/20060203204942/http://www.karmatics.com/aardvark/>. Retreived on Nov. 17, 2010.*

* cited by examiner

*Primary Examiner* — Kieu Vu
*Assistant Examiner* — Blaine Basom
(74) *Attorney, Agent, or Firm* — Schwegman Lundberg & Woessner, P.A.

(57) ABSTRACT

A system to permit a user-friendly approach to determine and access the portions of a program code associated with respective web page components is described. In one example embodiment, the system comprises an option detector and a mapping module. The option detector may be configured to detect an instruction to augment HTML markup of a web page with mapping, where the mapping associated with correlation between web page components and corresponding portions of program code. The mapping module may be configured to generate the mapping and to augment the HTML markup of the web page with the mapping.

20 Claims, 7 Drawing Sheets

METHOD AND SYSTEM TO MAINTAIN A WEB PAGE

RELATED APPLICATIONS

This application is related to and hereby claims the priority benefit of U.S. Provisional Patent Application No. 60/950,482 filed Jul. 18, 2007 and entitled "METHOD AND SYSTEM TO MAINTAIN A WEB PAGE", which application is incorporated herein by reference in its entirety.

TECHNICAL FIELD

This application relates to electronic commerce in general and a method and system to maintain a web page in particular.

BACKGROUND

HTML (Hypertext Markup Language) is the set of markup symbols or codes inserted in a file intended for display on a World Wide Web (web) browser page. The markup provides instructions to a web browser on how to display various components of the associated web page. Each individual markup code may be referred to as a tag. Some tags come in pairs that "wrap" a region of HTML markup and indicate when some display effect is to begin and when it is to end.

HTML code can be created manually, using, for example, a text editor. HTML code (or markup) may also be generated by a server-side program code or application. The appearance or functionality of a component on a web page may be modified by introducing changes to the portion of the server-side program code that is responsible for generating the HTML markup associated with that web page component.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system to maintain a web page is described. In the following description, for purposes of explanation, numerous specific details are set forth in order to provide a thorough understanding of an embodiment of the present invention. It will be evident, however, to one skilled in the art that the present invention may be practiced without these specific details.

Finding and fixing problems associated with a web page, particularly a dynamically generated web page, may be a challenging proposition. When a web page is constructed dynamically by server-side web application, it may be difficult to correlate the final HTML markup for the web page with the program code that generated it. A method and system is provided to permit a user-friendly approach to determine and access the portions of a program code associated with respective web page components. In one example embodiment, the server-side logic may be augmented with functionality to generate a web page such that the output HTML markup bears additional information allowing the components of the web page (and the associated HTML markup) to be correlated back to the specific portion of the program code on the server that produced the associated HTML markup. The additional information that facilitates this correlation, referred to as mapping information or merely mapping, may be introduced into the HTML markup in a selective manner, based on the state of a predetermined flag (or option). Thus, an author may choose to either have the HTML markup augmented by the mapping information, or to have the web page not burdened with any extra content. An option indicating whether the HTML markup of a web page is to be augmented by the mapping information may be determined at run-time.

In operation, the mapping in HTML markup, such as a mapping script, may be triggered by an end user, e.g., by a predetermined control operation, such as Ctrl Left-Click mouse sequence, when the associated web page is being displayed by the user's browser application. It will be noted that other activation keystrokes, such as, e.g., Ctrl-Click, Shift-Ctrl-click, etc., may be utilized. A mapping script, in one example embodiment, may be a JavaScript. The mapping JavaScript, when activated, may modify the display of the web page by highlighting those components, for which supplemental information is available. In one example embodiment, supplemental information for a web page component is displayed in a form of a hovering list box. The display of a hovering list box may be triggered when a user moves the cursor control over that web page component. The functionality that permits a user to access information regarding correlation between a web page component and a portion of the program code that generated HTML markup for that component may be termed spyglass functionality.

Spyglass functionality, described in further detail below, may be used advantageously whenever there is a need to go from a web page (and the associated HTML markup) back to the program code that produced the HTML markup. For example, such need may arise during a quality assurance cycle when trying to fix problems with production web pages or otherwise perform maintenance on the web pages. Example method and system to maintain a web page may be implemented in the context of a network environment 100 illustrated in FIG. 1.

Figure 1:
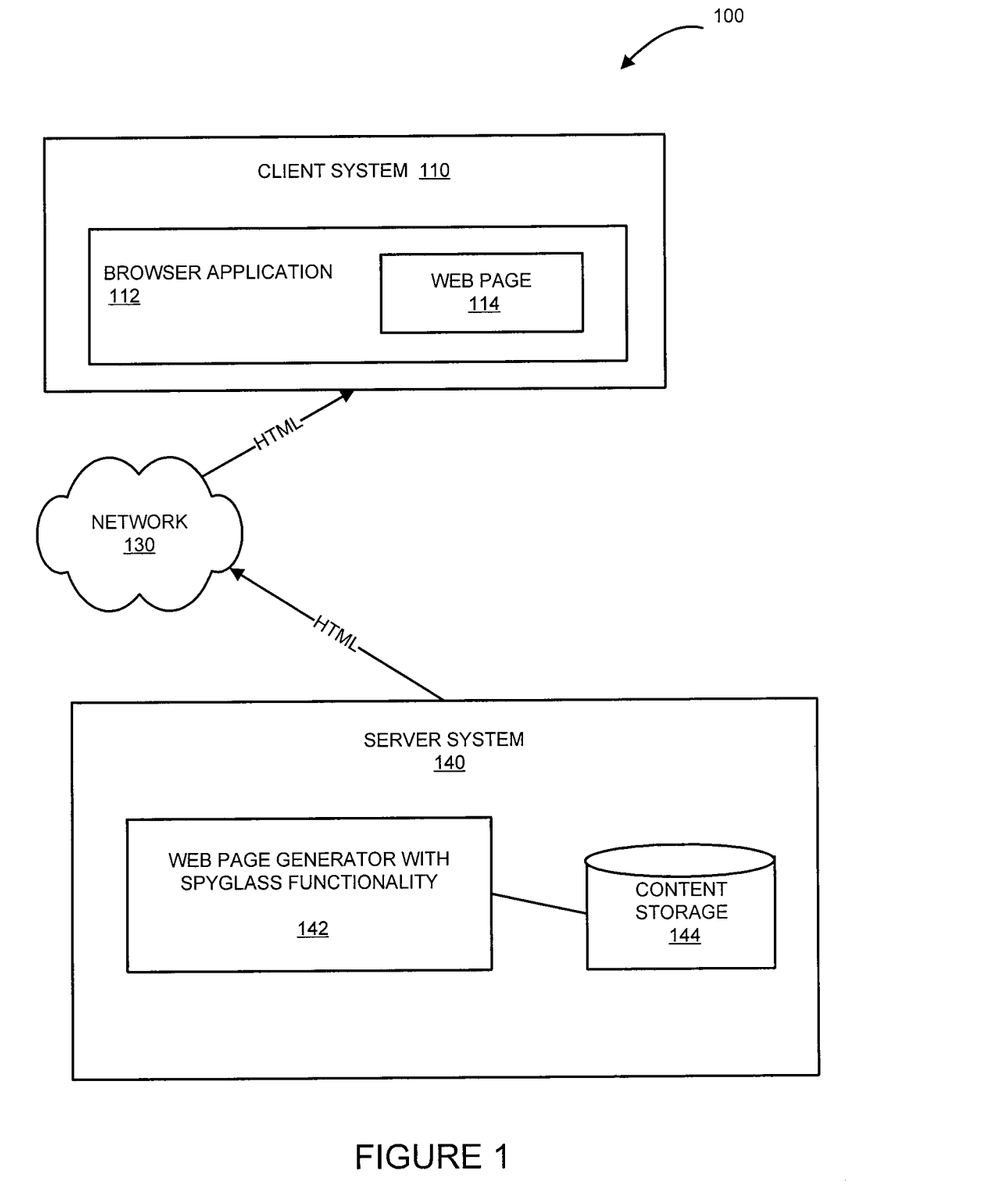
FIG. 1 is a diagrammatic representation of a network environment within which an example embodiment may be implemented.

As shown in FIG. 1, the network environment 100 includes a client system 110 and a server system 140. The client system 110 is in communication with the server system 140 via a communications network 130. The communications network 130 may be a public network (e.g., the Internet, a wireless network, etc.) or a private network (e.g., a local area network (LAN), a wide area network (WAN), Intranet, etc.).

The client system 110 may utilize a browser application 112 to access services provided by the server system 140. The server system 140 may employ a web page generator 142. The web page generator 142 may be configured to generate web pages with spyglass functionality. The server system 140 may also host a content storage 144 to store content utilized by the web page generator 142. An example web page generator that may be part of a web application is illustrated in FIG. 2.

Figure 2:
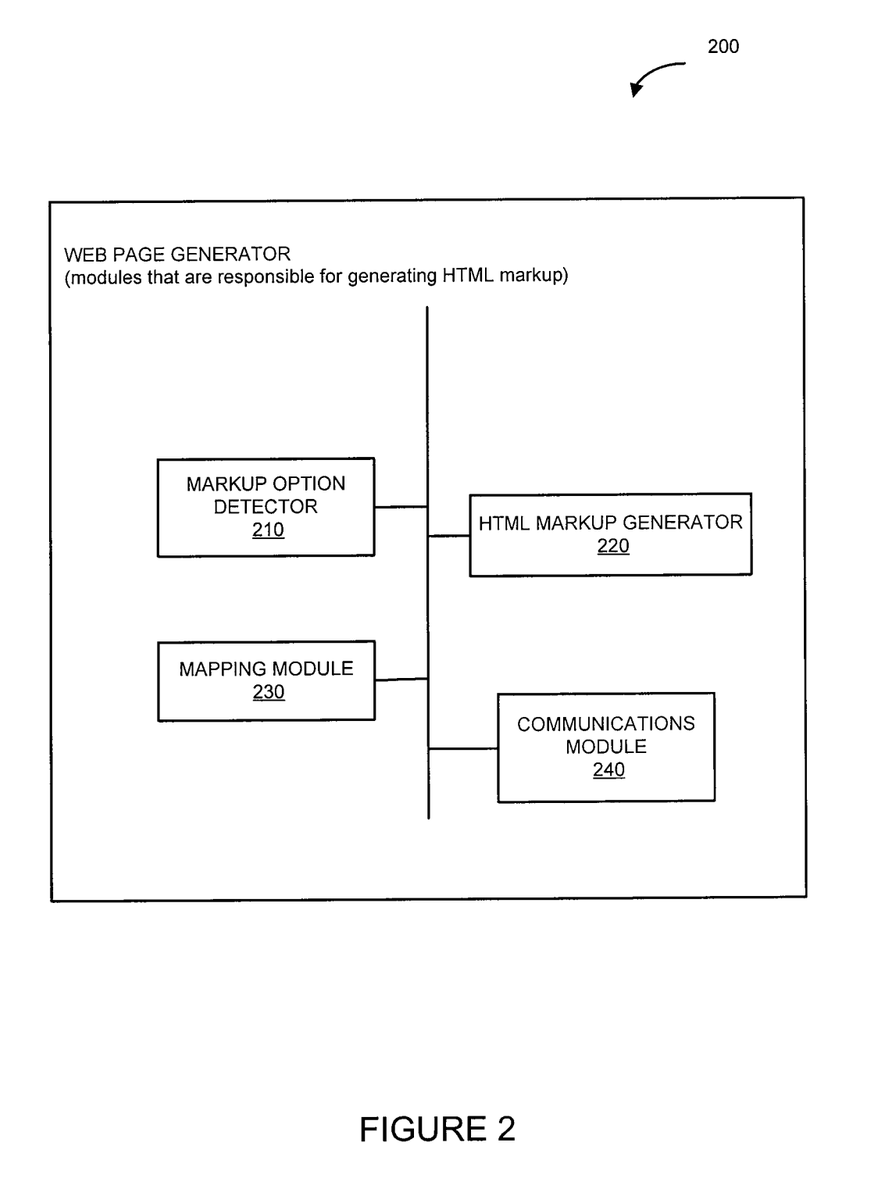
FIG. 2 is a block diagram of a system to generate mapping for a web page, in accordance with one example embodiment.

FIG. 2 is a block diagram of a web page generator 200, in accordance with one example embodiment. As shown in FIG. 2, the web page generator 200 includes a markup option detector 210, an HTML markup generator 220, a mapping module 230, and a communications module 240. The markup option detector 210 may be configured to determine that the HTML to be generated for a web page is to include supplemental information (mapping information) allowing an end user to correlate one or more web page elements with the associated program code in a user-friendly fashion. The HTML markup generator 220 may be configured to generate HTML markup for a web page. The mapping module 230, may be configured to generate mapping information for one or more web page components and to introduce it into the HTML markup.

The mapping information can be introduced into the HTML in one of several example forms depending on its planned usage, as listed below.
1. In the form of additional non-standard HTML attributes (custom attributes) placed on HTML tags.
2. In the form of additional tags such as the <span> tag that can wrap a region of HTML markup thereby identifying the portion pf HTML markup as being associated with the wrapping container. Such additional tag, in some example embodiments, may bear supplemental attributes to allow correlation of that portion of the HTML markup with a portion of the program code that generated that portion of the HTML markup.
3. In the form of HTML comments with "distinguishable" strings. Such HTML comment may wrap other tags and also carry the mapping information.
4. In supplemental JavaScript data structures carrying links back into the HTML markup of the page and bearing mapping information.

Returning to FIG. 2, in one example embodiment, the mapping module 230 may be configured to generate mapping information at different granularity levels, according to specific needs of an end user. For example, for a web page with component-based user interface objects intended for component-based usage, the mapping module 230 may be requested to insert mapping information into the associated HTML markup at the level of the component boundaries. In a different scenario, where it is desirable to easily correlate individual HTML tags with the program code portion that generated those individual HTML tags, the mapping module 230 may be requested to insert mapping information into the associated HTML markup at the level of individual HTML tags. The mapping module 230 may be configured to generate mapping that includes detail such as the trace-back path of server-side calls leading to the creation of the HTML element.

The communications module 240, in one example embodiment, may be configured to provide the generated HTML markup, which may be augmented with mapping information, to the browser application 112 of FIG. 1 running on the client system 110. The generated HTML markup may also be stored for further use by the server system that hosts the web page generator 200. An example method to generate mapping information for a web page can be described with reference to FIG. 3.

Figure 3:
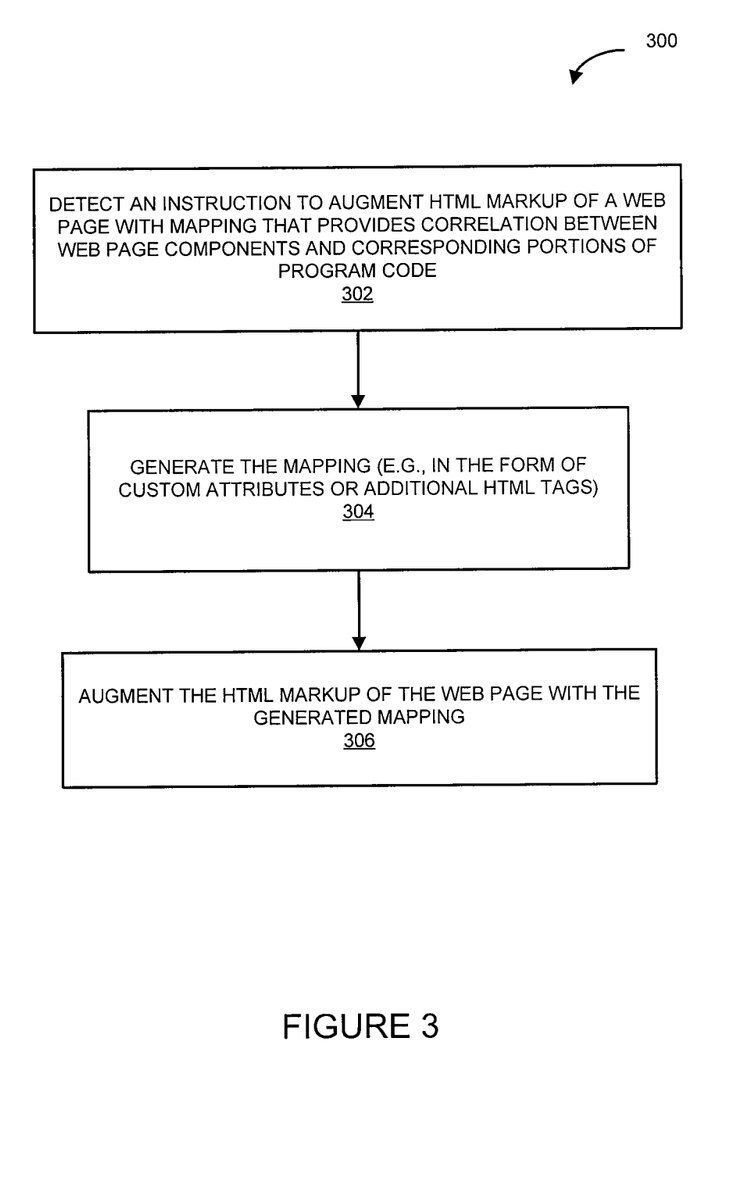
FIG. 3 is a flow chart of a method to generate mapping for a web page, in accordance with an example embodiment.

FIG. 3 is a flow chart of a method 300 to generate mapping for a web page, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the web page generator 142. In another example embodiment, the processing logic may be distributed between various servers that are part of the server system 140 of FIG. 1.

As shown in FIG. 3, the markup option detector 210 detects an instruction to augment HTML markup of a web page with mapping at operation 302. As mentioned above, the mapping refers to means for ascertaining correlation between web page components and corresponding portions of program code responsible for generating respective web page components. At operation 304, the mapping module 230 generates the mapping, which may be, for example, in the form of custom attributes, additional HTML tags, JavaScript data structures, etc. At operation 306, the mapping module 230 augments the HTML markup of the web page with the generated mapping.

As mentioned above, a web page that has its HTML markup augmented with mapping information provides end users with ability to determine which portion of the program code is responsible for generating a particular web page component. In one example embodiment, the method to maintain a web page described herein utilizes the embedded mapping information to permit easy movement from the HTML markup to the corresponding portion of the program code. In one example embodiment, when mapping information is activated, additional JavaScript (that may be referred to as a mapping script) is introduced into the HTML markup of the web page. A mapping script may be designed to process mapping information in the HTML markup and display various supplemental information related to web page components. Example supplemental information may include the name of the web page component (the subject web page component), the Java class that the web page component belongs to, names of components that wrap the subject web page component (e.g., composite components), etc. Example operations performed at a web browser when a mapping script associated with a web page is activated can be described with reference to FIG. 4.

Figure 4:
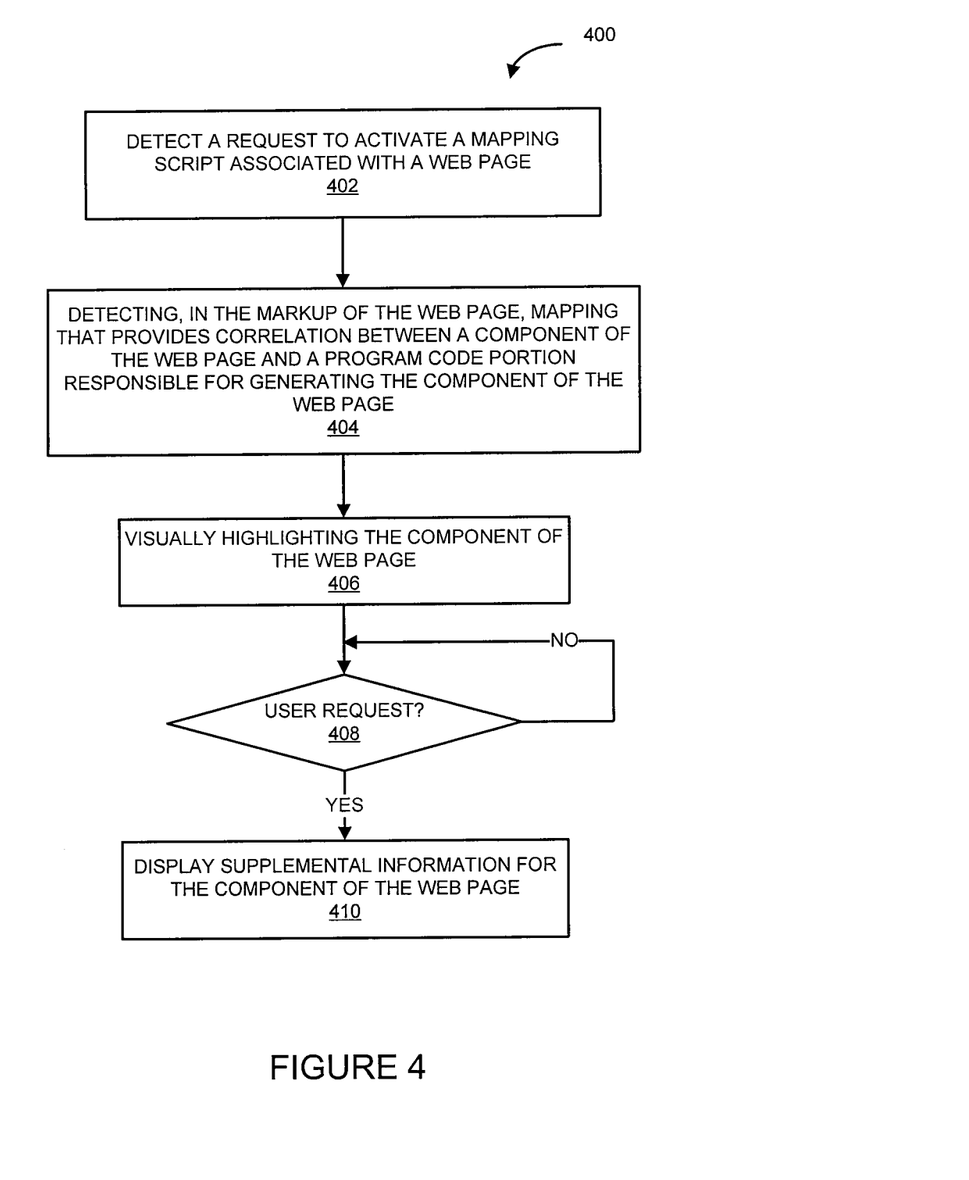
FIG. 4 is a flow chart of a method to process a request to activate a mapping script associated with a web page, in accordance with an example embodiment.

FIG. 4 is a flow chart of a method 400 to process a request to activate a mapping script associated with a web page, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the client system 110 of FIG. 1 and, specifically, embedded in the browser application 112 and the web page 114.

As shown in FIG. 4, the browser application 112 detects a request to activate a mapping script (e.g., a JavaScript) associated with the web page 114 at operation 402. A request to activate a mapping script may be triggered, e.g., by a Ctrl Left-Click mouse sequence. At operation 404, the browser application 112 detects, in the associated HTML markup of the web page, mapping that identifies correlation between one or more components of the web page and a program code portion responsible for generating those web page components. A component on the web page 114 that has associated mapping information embedded in the associated HTML markup may be referred to as a "mapped" component. The browser application 112 visually highlights each "mapped" component on the web page 114 at operation 406. The highlighting may be accomplished, for example, by surrounding a web page component with a distinguishable color border.

In one example embodiment, if a user of the browser application 112 moves a pointer control (e.g., the mouse cursor) over a "mapped" web page component, the browser application 112 treats it as a request to display supplemental information and as an event to trigger the display of supplemental information associated with that web page component. If, at operation 408, such request to show supplemental information (e.g., data associated with the program code portion responsible for generating the web page component) is detected, the supplemental information is displayed at operation 410.

Figure 5:
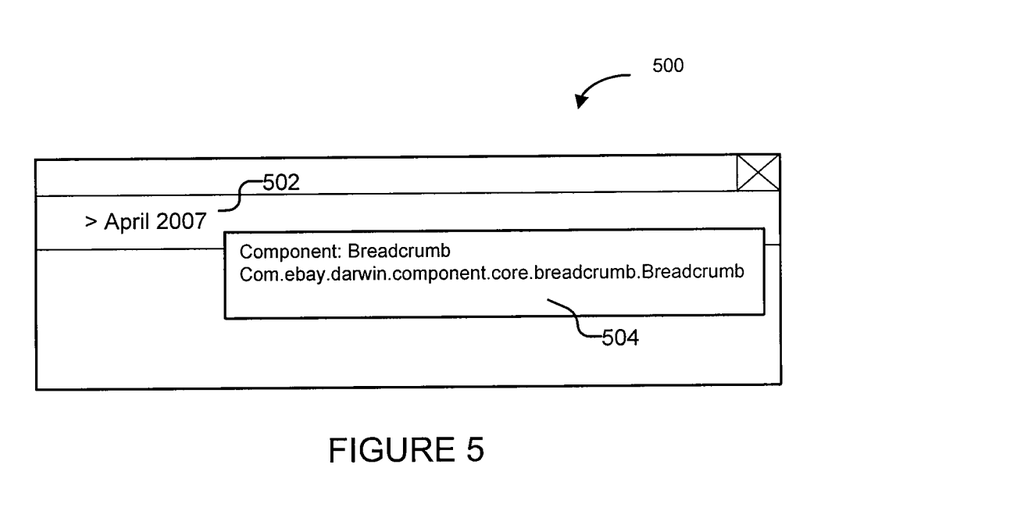
FIG. 5 is a diagrammatic representation of a user interface that includes supplemental information associated with a component of a web page, in accordance with an illustrative embodiment.

In one embodiment, if the mouse cursor hovers over a component, the associated area of the web page 114 is shaded gray and a popup window may be presented showing information about the web page component. An example of such pop-up window is illustrated in FIG. 5. FIG. 5 is a diagrammatic representation of a user interface 500. As shown in FIG. 5, additional details describing a web page component 502 are displayed in a pop-up display area 504. Additional details displayed in the pop-up display area 504 may be referred to as "hover" information, because it is displayed while a cursor pointer control is hovering over the web page component.

Figure 6:
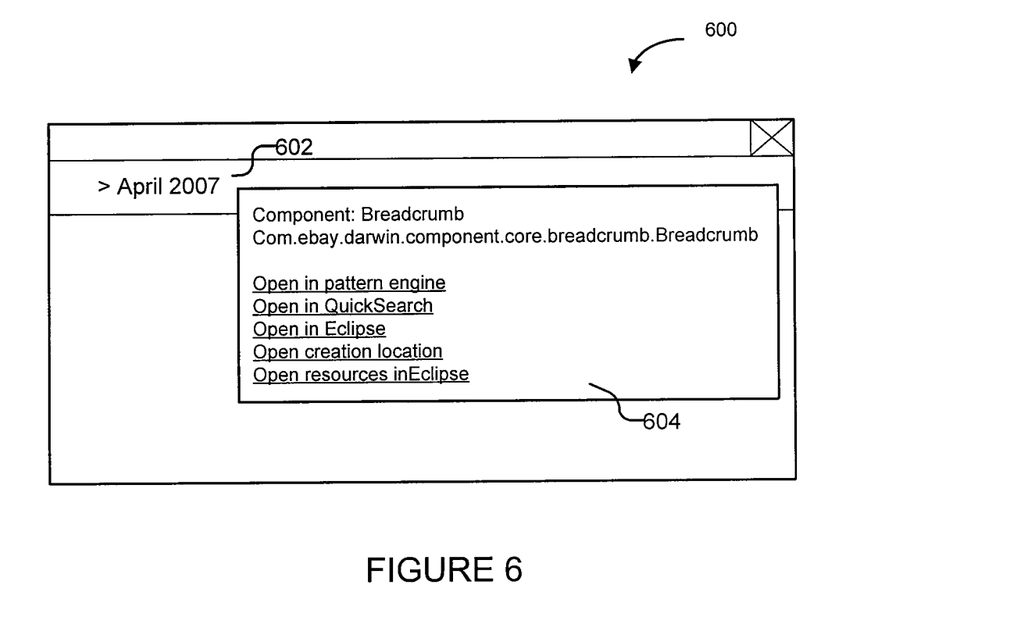
FIG. 6 is a diagrammatic representation of a user interface that includes a menu of action items associated with a component of a web page, in accordance with an illustrative embodiment.

A state where a cursor control is positioned over a "mapped" web page component (sometimes termed a hover mode), in one example embodiment, provides to a user a browsing facility to inspect objects on the web page, which, in turn, facilitates a better understanding of the web page. In order to permit a user to perform actions on a particular "mapped" web page component, the mapping in the HTML markup may include instructions to "lock" the focus on the "hover" information in response to a predetermined user action, e.g., a user pressing the Shift key. Once the focus on the "hover" information is locked, the "hover" information may be supplemented with a menu of action items. An example menu of action items is illustrated in FIG. 6. FIG. 6 is a diagrammatic representation of a user interface 600. As shown in FIG. 6, links to the source code that produced HTML markup for a web page component 602 are displayed in a pop-up display area 604.

In one example embodiment, the mapping may facilitate direct navigation from an HTML browsing mode view to locations in an Integrated Development Environment (IDE). Direct navigation capability may be achieved, for example, by running, within the IDE, a light-weight server that can receive command requests from JavaScript browsing mode code in the web page. Integration may be, for example, with Eclipse, an open source Java-based IDE, or other development environments capable of hosting a server and allowing programmatic opening of code files and positioning to specific lines of code.

As shown in FIG. 6, a user may be permitted to navigate directly to the Java class that implements the Breadcrumb component 602 or directly to the Resource class associated with that component. In one example embodiment, the system to maintain a web page maybe configured to permit a user to navigate directly to the line of code that added that component to the web page. This technique may facilitate an improvement of maintenance or enhancement activities with respect to a web page, where the fixes or changes need to be made to program code that is germane to part of the web page.

Some example applications of the method and system to maintain a web page include, for example, direct navigation from a web page to the associated program code that produced HTML markup for a particular component of the web page, direct linkage from a particular web page component to a User Interface library of components, as well as direct linkage to knowledge management systems. A library of web page components may store information about web page components such as characteristics of the web page components, information indicating when a particular web page component should be used, contact information of persons that may provide information about web page components, etc. The knowledge management systems may include information about web page components such as, for example, a list of locations in the associated program code where a particular web page component is referenced.

Figure 7:
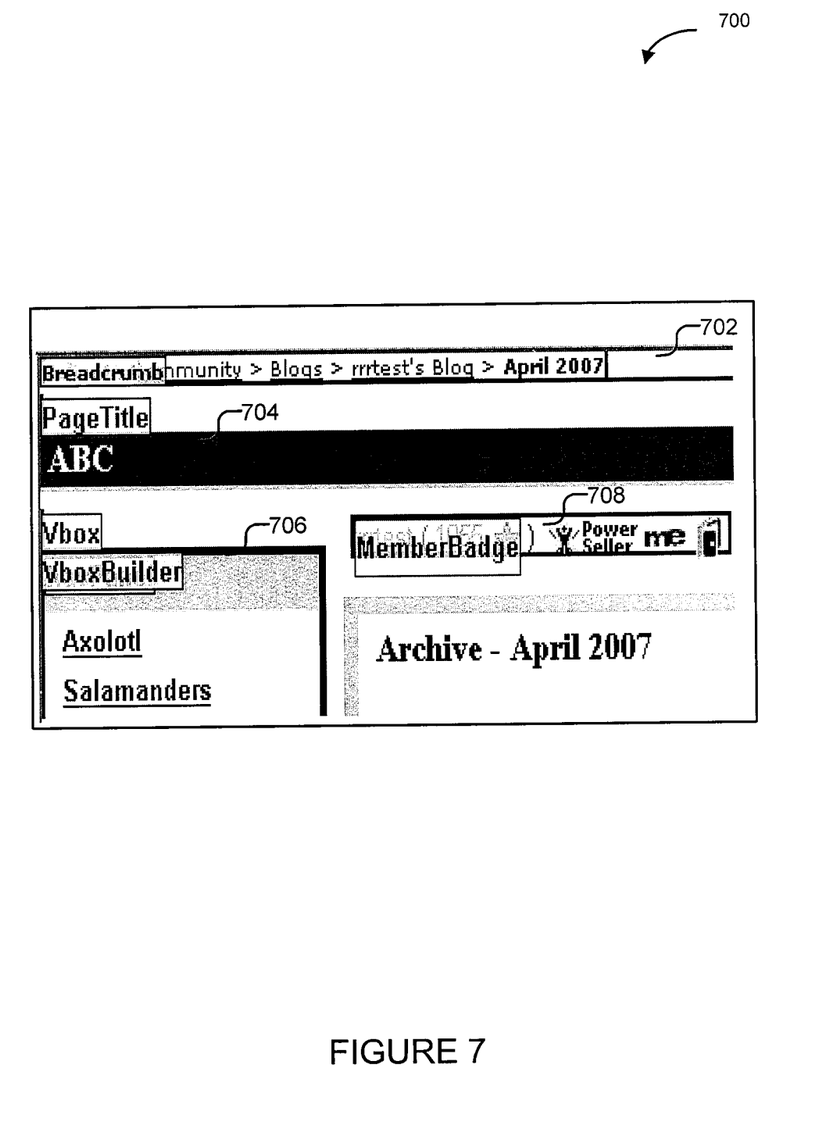
FIG. 7 is a diagrammatic representation of an example web page with visual annotations, in accordance with an illustrative embodiment.

In one example embodiment, a web page that has been augmented with mapping information may be displayed with visual annotations of the mapped components and, for example, a summary of the resources used by the web page. Example resources may include, images, links to static pages, cascading style sheets (CSS), JavaScripts (JS), content, etc. The display of a web page with visual annotations may be utilized as supplemental documentation of a web page and may contribute to better understanding of the web page by users seeking to enhance or modify the web page. Mapping information may also provide insight to designers who wish to reuse web page components in determining which web page components are used on the web page. An example web page with visual annotations of the components and a summary of the resources used by the web page is illustrated in FIG. 7. As shown in FIG. 7, in an example web page 700, various web page components have visual annotations. For example, a breadcrumb component 702 is identified by the annotation as "Breadcrumb," a web page title component 704 is identified by the annotation as "Page Title," a vertical box component 706 is identified by the annotation as "Vbox" and more specifically "VboxBuilder," and a member component 708 is identified by the annotation as "MemberBadge."

In some embodiments, a method and system to maintain a web page may be utilized advantageously to permit users to navigate directly from content strings in a web page to the master text content. Where the content strings are from a localized version of the master content, direct navigation from the associated web page to the master content may be useful in a scenario where, e.g., the translation of a mistranslated string in a web page back needs to be corrected. Direct manipulation of text strings on a web page by authorized users who may wish to change the wording of a web page may also be accomplished utilizing the method and system described herein. The mapping embedded in a web page (that may also be referred to as linkage information) may allow a JavaScript embedded in the web page to pop-up an editing window such that a change to the text in the web page performed by a user may be communicated to the server-side content management system for review and acceptance.

Some other example uses of mapping embedded in HTML markup of a web page may include features as listed below.

Direct linkage to a static HTML page such as a help page to the file implementing that page for the purpose of editing that page.

Direct linkage from an image to the image management system owning that image and other internationalized versions of the image for the purposes of editing the image.

For HTML tag level linkage, a full trace-back of the call chain leading to the creation of the tag may be preserved. That trace-back chain, combined with information maintained by a source code control system, may be configured to identify a software developer responsible for a change to a specific piece of code. Starting from a perceived problem on a web page, one could, using the embedded mapping, automatically determine whom to assign a problem report to.

For components, a full display of the input data values supplied when creating the component Direct linkage from textual content originating in Content storage 144 to the server-side code that added that content to the web page.

In the context of quality assurance and debugging tasks, the method and system to maintain a web page, in one example embodiment, may be useful, e.g., even to those not familiar with the web page, permitting them to quickly access the area of program code responsible for the problem and to fix the problem.

Example potential advantages of using one or more techniques described herein may be identified as follows.

Reduced time to find and fix problems with web pages.

A facility for understanding the composition of a web page in terms of reusable user interface (UI) components.

Direct manipulation of content on a web page by content managers, possibly in multiple countries with content presented on the web page being in a foreign language.

Assignment, in a more streamlined manner, of a web page defect and the individual developer likely to have caused the defect.

It will be noted that a method and system to maintain a web page may be implemented in a variety of ways, utilizing a variety of equipment components and programmatic techniques. In one example embodiment, a machine-readable medium may be provided having instruction data to cause a machine to detect a request to activate a mapping script associated with a web page, detecting, in a markup of the web page, mapping between a component of the web page and a program code portion responsible for generating the web page component; and visually highlight the component of the web page. A further machine-readable medium may be provided having instruction data to cause a machine to detect a request to generate markup instructions for a web page, detect an indication that the markup is to include markup information, the markup information to reflect a mapping between a web page component and a program code portion responsible for generating the web page component, and generate the markup instructions for the web page, the markup instructions including the mapping information.

Figure 8:
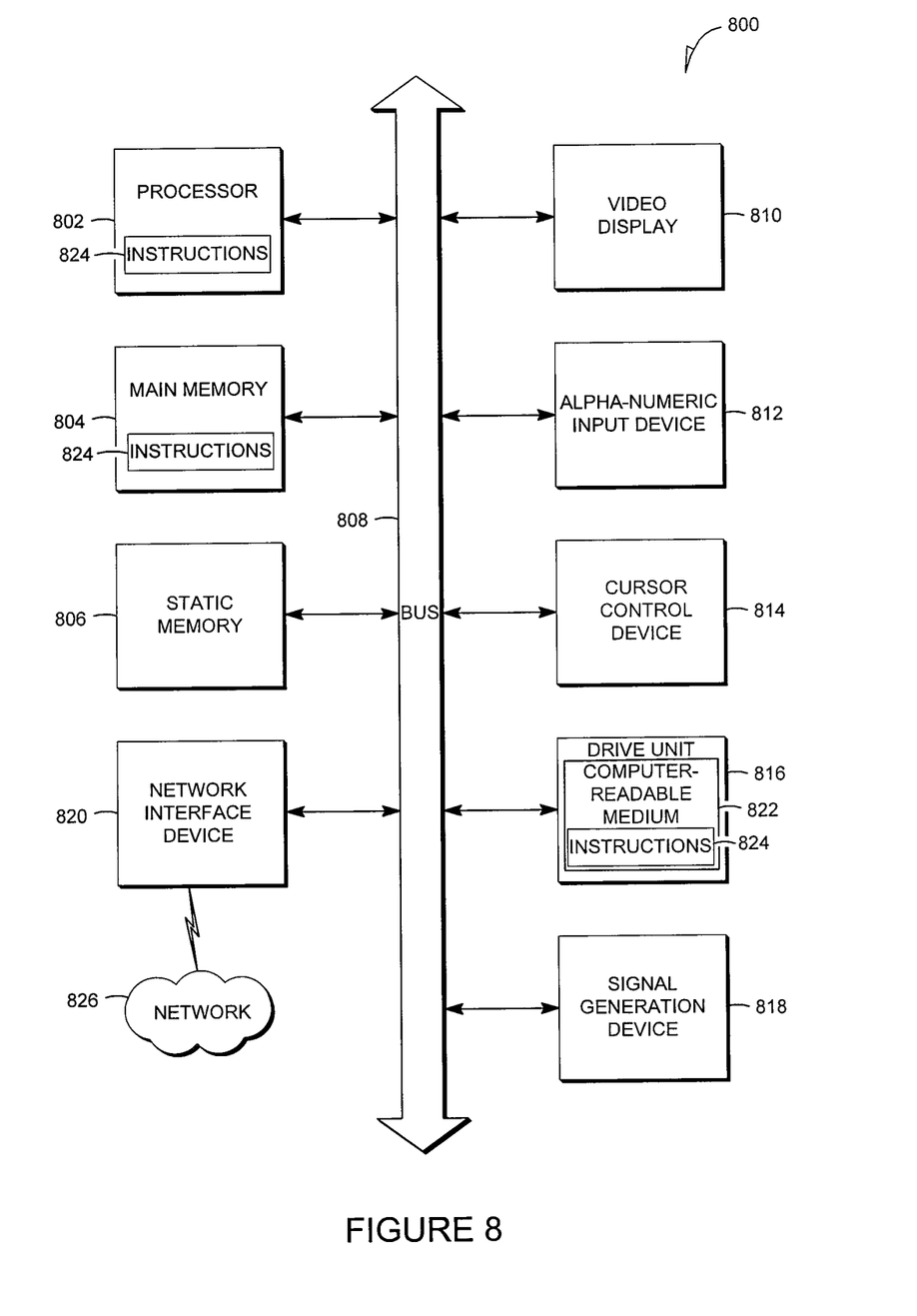
FIG. 8 is a diagrammatic representation of an example machine in the form of a computer system within which a set of instructions, for causing the machine to perform any one or more of the methodologies discussed herein, may be executed.

FIG. 8 shows a diagrammatic representation of a machine in the example form of a computer system 800 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a user interface (UI) navigation device 814 (e.g., a cursor control device), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, with the main memory 804 and the processor 802 also constituting machine-readable media.

The software 824 may further be transmitted or received over a network 826 via the network interface device 820 utilizing any one of a number of well-known transfer protocols (e.g., Hyper Text Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of embodiments of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system to manage a web page has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A system comprising:
a memory;
at least one processor coupled to the memory;
an option detector to detect, utilizing the at least one processor, a state of a flag, the state of the flag indicating an instruction to augment HTML markup of a web page with mapping, the mapping associated with correlation between web page components and corresponding portions of program code, the corresponding portions of program code being responsible for generating the respective web page components; and a mapping module to, in response to the state of the flag:
  generate the mapping, and
  augment the HTML markup of the web page with the mapping.

2. The system of claim 1, wherein the mapping comprises a custom attribute placed on an HTML tag.

3. The system of claim 1, wherein the mapping comprises an additional HTML tag, the additional HTML tag wrapping a region of the HTML markup of the web page.

4. The system of claim 1, wherein the mapping comprises an HTML comment.

5. The system of claim 1, wherein the mapping comprises a supplemental JavaScript data structure.

6. The system of claim 1, wherein granularity associated with the mapping is at a level of component boundary, the component associated with a user interface (UI) object in the web page.

7. The system of claim 1, wherein granularity associated with the mapping is at a level of an HTML tag in the HTML markup of the web page.

8. A method comprising:
  detecting a state of a flag, the state of the flag indicating a request to generate markup instructions for a web page, the markup to include markup information, the markup information to reflect a mapping between a web page component and a program code portion responsible for generating the web page component; and
  generating, in response to the detecting of the state of the flag, the markup instructions for the web page, the markup instructions including the mapping information.

9. The method of claim 8, comprising providing the generated markup instructions for the web page to a web browser application.

10. The method of claim 8, comprising storing the generated markup instructions for the web page for further use.

11. The method of claim 8, wherein the markup instructions are hyper-text mark up language (HTML) instructions.

12. The method of claim 8, wherein the indication that the mark up is to reflect a mapping between a web page component and a program code portion responsible for generating the web page component is an option that may be turned off in the program code.

13. The method of claim 8, wherein the mapping comprises a custom attribute placed on an HTML tag.

14. The method of claim 8, the method comprising:
  detecting a request to activate a mapping script associated with a web page;
  detecting, in a markup of the web page, mapping between a component of the web page and a program code portion responsible for generating the web page component; and
  visually highlighting the component of the web page.

15. The method of claim 14, wherein the mapping script is to implement:
  detecting a request to show data associated with the program code portion responsible for generating the web page component; and
  displaying supplemental information associated with the web page component, the supplemental information including information related to the program code portion responsible for generating the web page component.

16. The method of claim 15, wherein detecting the request to show data associated with the program code portion responsible for generating the web page component comprises detecting that a mouse cursor is positioned over the web page component.

17. The method of claim 14, wherein the mapping script is to implement:
  detecting a request to lock the displaying of the supplemental information associated with the web page component; and
  augmenting the supplemental information associated with the web page component with a menu of action items.

18. The method of claim 17, wherein the menu of action items includes a link to a location in a development environment, the location being associated with the program code portion responsible for generating the web page component.

19. The method of claim 14, wherein the detecting of the request to activate the mapping script includes detecting a Ctrl Left-Click mouse sequence.

20. The method of claim 14, wherein the detecting of the request to activate the mapping script includes detecting a request to activate JavaScript code.

* * * * *

UNITED STATES PATENT AND TRADEMARK OFFICE
CERTIFICATE OF CORRECTION

PATENT NO.        : 9,122,762 B2
APPLICATION NO.   : 11/959993
DATED             : September 1, 2015
INVENTOR(S)       : Richard Ragan It is certified that error appears in the above-identified patent and that said Letters Patent is hereby corrected as shown below:

IN THE CLAIMS

In column 9, line 32, in Claim 8, delete "generating ," and insert --generating,--, therefor In column 10, line 5, in Claim 14, delete "a" and insert --the--, therefor In column 10, line 6, in Claim 14, delete "a" and insert --the--, therefor In column 10, line 30, in Claim 17, after "of", delete "the", therefor Signed and Sealed this
Twelfth Day of January, 2016

Michelle K. Lee
*Director of the United States Patent and Trademark Office*